United States Patent
Wang et al.

(10) Patent No.: US 12,506,148 B2
(45) Date of Patent: Dec. 23, 2025

(54) PREPARATION METHODS OF DOPED MANGANESE PHOSPHATE PRECURSOR AND DOPED LITHIUM MANGANESE PHOSPHATE CATHODE MATERIAL

(71) Applicant: Kunming University of Science and Technology, Kunming (CN)

(72) Inventors: Ding Wang, Kunming (CN); Jianguo Duan, Kunming (CN); Runlin Li, Kunming (CN); Xianshu Wang, Kunming (CN); Yingjie Zhang, Kunming (CN); Peng Dong, Kunming (CN)

( * ) Notice: Subject to any disclaimer, the term of this patent is extended or adjusted under 35 U.S.C. 154(b) by 0 days.

(21) Appl. No.: 19/060,928

(22) Filed: Feb. 24, 2025

(65) Prior Publication Data
US 2025/0286061 A1   Sep. 11, 2025

(30) Foreign Application Priority Data
Mar. 5, 2024 (CN) .......................... 202410248776.9

(51) Int. Cl.
  *H01M 4/58* (2010.01)
  *C01B 25/45* (2006.01)
  *H01M 4/36* (2006.01)

(52) U.S. Cl.
  CPC .......... *H01M 4/5825* (2013.01); *C01B 25/45* (2013.01); *H01M 4/366* (2013.01); *C01P 2002/50* (2013.01); *C01P 2002/72* (2013.01); *C01P 2004/03* (2013.01); *C01P 2006/40* (2013.01)

(58) Field of Classification Search
  CPC .................................................. H01M 4/5825
  See application file for complete search history.

(56) References Cited

FOREIGN PATENT DOCUMENTS

| CN | 116332147 A | * | 6/2023 | ............. | C01B 25/45 |
| CN | 117383533 A | * | 1/2024 | ............. | C01B 25/45 |

OTHER PUBLICATIONS

Zhang et al. English machine translation of CN 116332147 A. (Year: 2023).*

Zhou et al. English machine translation of CN 117383533 A. (Year: 2024).*

(Continued)

*Primary Examiner* — Peter F Godenschwager
(74) *Attorney, Agent, or Firm* — Addison D. Ault; IPGentleman Intellectual Property Services, LLC

(57) ABSTRACT

A preparation method of a doped manganese phosphate precursor includes steps as follows. Manganous salt and a doping metal M salt are dissolved in an acidic solution to obtain a dissolved solution, and then the dissolved solution is mixed with a phosphoric acid to form a mixed solution. The mixed solution is heated at a heating temperature in a range of 150° C. to 250° C. to obtain a heated solution, then a high-valent manganese salt is added into the heated solution to perform a reaction. After the reaction is complete, a precursor slurry is obtained. The precursor slurry is washed, filtered, and dried to yield the doped manganese phosphate precursor. The preparation method is simple, easy to operate, highly efficient, environmentally friendly, and low-cost. The precursor has high phase purity, controllable particle size ranging from the nanoscale to the microscale, good dispersibility, and high crystallinity.

3 Claims, 2 Drawing Sheets

(56) References Cited

OTHER PUBLICATIONS

CNIPA, Notification of Second Office Action for CN202410248776.9, Aug. 31, 2024.
Kunming University of Science and Technology (Applicant), Replacement claims (allowed) of CN202410248776.9, Sep. 9, 2024.
CNIPA, Notification to grant patent right for invention in CN202410248776.9, Oct. 24, 2024.

* cited by examiner

PREPARATION METHODS OF DOPED MANGANESE PHOSPHATE PRECURSOR AND DOPED LITHIUM MANGANESE PHOSPHATE CATHODE MATERIAL

CROSS-REFERENCE TO RELATED APPLICATION

This application claims priority to Chinese Patent Application No. 202410248776.9, filed on Mar. 5, 2024, which is herein incorporated by reference in its entirety.

TECHNICAL FIELD

The disclosure relates to the field of lithium-ion battery cathode materials, and particularly to a preparation method of a doped manganese phosphate precursor and a preparation method of a doped lithium manganese phosphate cathode material.

BACKGROUND

Among various lithium-ion battery cathode materials, lithium iron phosphate ($LiFePO_4$) is a preferred material system for large-scale energy storage applications in commercial lithium-ion batteries due to its low cost, safety and stability, and environmentally friendly nature. In recent years, thanks to the widespread application of cell to pack (CTP) technology from Contemporary Amperex Technology Co., Limited (CATL) and blade battery technology from BYD Company Limited (BYD), the energy density, safety performance, cycle life, and cost of $LiFePO_4$ batteries have been further improved, leading to a gradual increase in a installed capacity of the $LiFePO_4$ batteries. However, under the background of "dual carbon" goals (also referred to as carbon peaking and carbon neutrality goals), large-scale energy storage has put forward higher requirements for battery cost, energy density, safety performance, cycle life, and rate performance. A working voltage of a full $LiFePO_4$ battery is around 3.2 volts (V), which is lower than that of currently commercially used lithium-ion batteries such as lithium cobalt oxide ($LiCoO_2$) and lithium nickel cobalt manganese oxide ($LiNi_{1-x-y}Co_xAl(Mn)_yO_2$) (3.6 V to 3.7 V). This greatly limits the application scope of $LiFePO_4$. The theoretical voltage platform of $Mn^{2+}/Mn^{3+}$ in lithium manganese iron phosphate cathode material ($LiMn_{1-x}Fe_xPO_4$, where $0 \le x \le 0.2$) relative to $Li/Li^+$ is 4.1 V, and its energy density is nearly 20% higher than that of $LiFePO_4$. In theory, it can replace the expensive lithium cobalt oxide and ternary cathode materials.

At present, there is no mature process route for lithium manganese phosphate and lithium manganese iron phosphate available for reference in the industry and academia. For example, manganese phosphate is used as a precursor to prepare the lithium manganese phosphate and the lithium manganese iron phosphate materials, which is currently a research hotspot in the industry. The cathode materials prepared by the process route using the manganese phosphate as the precursor have the advantages of simple lithium pairing, high crystallinity, uniform particle size distribution, excellent electrochemical performance, and good consistency. However, due to the fact that $Mn^{3+}$ undergoes a disproportionation reaction in an aqueous solution and cannot exist stably, resulting in the formation of $Mn^{2+}$ and $MnO_2$, this objective reason limits the production of manganese phosphate materials in the aqueous solution. Therefore, there is currently no reliable technology available for large-scale use. The existing preparation methods usually involve oxidizing $Mn^{2+}$ to $Mn^{3+}$ using nitrates in ethanol or the aqueous solution, followed by reaction with phosphoric acid or phosphate to form manganese phosphate (referring to "Nanocrystalline Serrabrancaite ($MnPO_4 \cdot H_2O$) Prepared by a Simple Precipitation Route at Low Temperature, Journal of Alloys and Compounds, 2008 454 78-82" and "Journal of The Electrochemical Society, $MnPO_4 \cdot H_2O$ as Electrode Material for Electrochemical Capacitors, 2018 165 (10) A2349-A2356"). However, the methods use nitrates as oxidants, which have high production costs and generate nitrogen-containing waste liquids and gases, causing significant environmental pollution. Moreover, the use of ethanol as a solvent further increases production and environmental protection costs. The Chinese patent with a publication number of CN112142028A and an article of "Self-assembly synthesis of dumbbell-like $MnPO_4 \cdot H_2O$ hierarchical particle and its application in $LiMnPO_4/C$ cathode materials (Ceramics International, 2021 47 19687-19693)" also propose preparing the manganese phosphate materials by heating potassium permanganate and concentrated phosphoric acid in the aqueous solution. However, in the method, the manganese source is entirely from potassium permanganate, and it cannot achieve the oxidation of $Mn^{2+}$ in the aqueous solution. The cost is relatively high, which is not conducive to large-scale production. Therefore, it is necessary to develop a method for oxidizing and preparing manganese phosphate materials in an aqueous solution.

SUMMARY

In view of the deficiencies existing in the related art, one of the objectives of the disclosure is to address one or more of the problems existing in the above related art. For example, one of the objectives of the disclosure is to provide a preparation method of a doped manganese phosphate precursor and a preparation method of a doped lithium manganese phosphate cathode material.

The preparation method of a doped manganese phosphate precursor includes steps as follows.

Manganous salt and a doping metal M salt are dissolved in an acidic solution (sulfuric acid solution) to obtain a dissolved solution, and then the dissolved solution is mixed with a concentrated phosphoric acid to form a mixed solution. The mixed solution is heated at a heating temperature to obtain a heated solution, then a high-valent manganese ($Mn^{3+n}$) salt is added into the heated solution to perform a reaction. After the reaction is complete, a precursor slurry is obtained. The heating temperature of the mixed solution is in a range of 150° C. to 250° C., and n=1, 3, 4. The precursor slurry is washed, filtered, and dried to yield the doped manganese phosphate precursor ($Mn_xFe_{1-x}PO_4 \cdot H_2O$), where $0.5 \le x \le 1.0$.

In an embodiment, a concentration of metal cations in the mixed solution is in a range of 0.5 moles per liter (mol/L) to 2.5 mol/L.

In an embodiment, the manganous salt includes at least one selected from the group consisting of manganous sulfate, manganous acetate, manganous chloride, and manganous oxalate. A doping metal M salt is a soluble salt, where M includes at least one selected from the group consisting of Fe, nickel (Ni), cobalt (Co), magnesium (Mg), tantalum (Ta), and niobium (Nb).

In an embodiment, a molar ratio of metal cations to phosphate anions in the mixed solution is in a range of 1:(2-2.5).

In an embodiment, a high-valent manganese ($Mn^{3+n}$) salt includes at least one selected from the group consisting of potassium permanganate, potassium manganate, and manganese dioxide. A molar ratio of the high-valent manganese salt to the metal cations in the mixed solution is in a range of $1:(1.2n–2.0n)$.

In an embodiment, before obtaining the precursor slurry, the preparation method further includes steps as follows. After heating the mixed solution, the high-valent manganese salt is added into the mixed solution to form an intermediate substance $[Mn(PO_4)_2]^{3-}$, followed by continuously stirring for 5 minutes (min) to 20 hours (h) to form the precursor slurry.

The doped manganese phosphate precursor is prepared by using the preparation method mentioned above.

A preparation method of a doped lithium manganese phosphate cathode material includes:

mixing the doped manganese phosphate precursor prepared by using the preparation method mentioned above with a lithium source and a carbon source to obtain a mixture, and then calcining the mixture under an inert atmosphere to obtain a carbon-coated LiMnxFe1-xPO4/C cathode material, where x is greater than or equal to 0.5 and less than or equal to 1.0 (0.5≤x≤1.0).

In an embodiment, a molar ratio of lithium (Li) in the lithium source to a total amount of metal of manganese (Mn) and ferrum (Fe) in the doped manganese phosphate precursor is $n(Li):n(Mn+Fe)=(1–1.10):1$; an addition amount of the carbon source, calculated based on a sum of atomic weights of total non-lithium metal atoms, is 5 g to 50 g per 1 mole of the total non-lithium metal atoms.

In an embodiment, the lithium source includes at least one selected from the group consisting of lithium carbonate ($Li_2CO_3$), lithium nitrate ($LiNO_3$), and lithium hydroxide monohydrate ($LiOH·H_2O$). The carbon source includes at least one selected from the group consisting of starch, polyvinyl alcohol, sucrose, citric acid, and glucose. The calcining includes: holding the mixture at 300° C. to 500° C. for 3 to 10 h, followed by calcining at 600° C. to 800° C. for 5 h to 20 h.

The doped lithium manganese phosphate cathode material is prepared by using the preparation method mentioned above.

Compared to the related art, the beneficial effects of the disclosure are as follows.

1. The preparation method of the doped manganese phosphate in the disclosure has realized the preparation of manganese phosphate ($MnPO_4·H_2O$) materials and metal doping in the aqueous solution. Compared with the existing preparation processes of manganese phosphate materials, the preparation method of the disclosure is simple, easy to operate, highly efficient, environmentally friendly, and low-cost. The prepared doped manganese phosphate precursor has high phase purity, controllable particle size ranging from the nanoscale to the microscale, good dispersibility, and high crystallinity.

2. The preparation method of the doped lithium manganese phosphate cathode material in the disclosure has the advantages of a short process, low energy consumption, high atomic utilization rate, and low working difficulty. The prepared cathode material has high crystallinity, uniform particle size distribution, excellent electrochemical performance, and good consistency.

BRIEF DESCRIPTION OF DRAWINGS

The above and other objectives and features of the disclosure will become clearer through the following description in conjunction with the attached drawings.

DETAILED DESCRIPTION OF EMBODIMENTS

Figure 1:
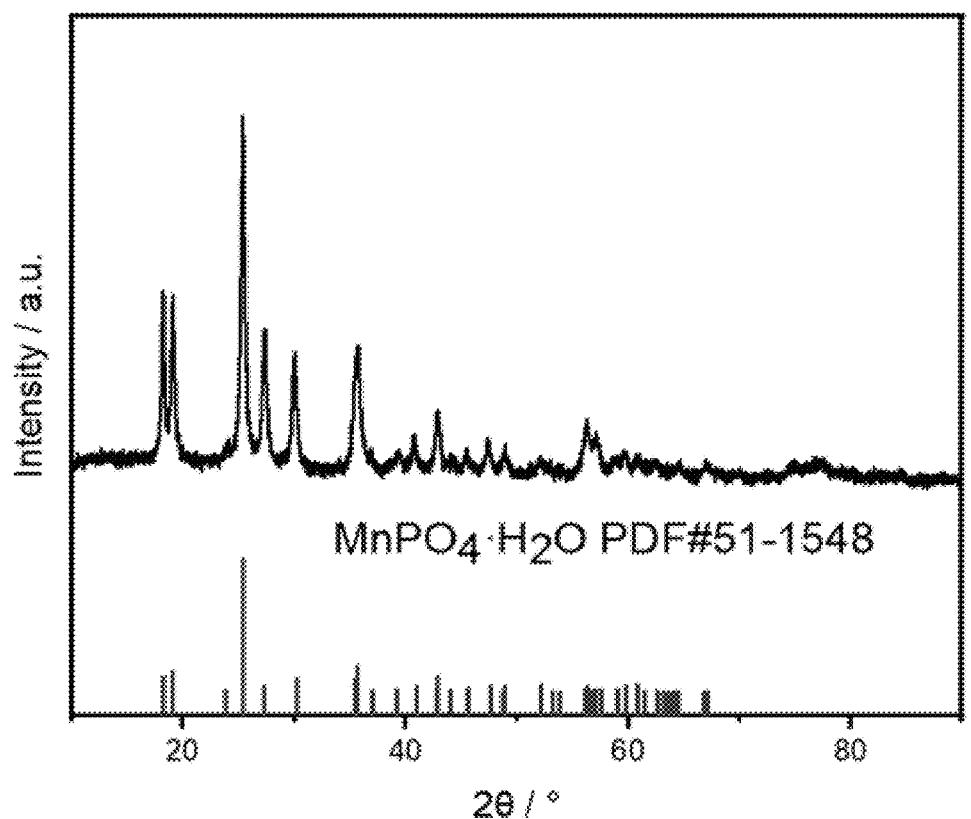
FIG. 1 illustrates an X-ray diffraction (XRD) pattern of an iron-doped manganese phosphate precursor prepared in an embodiment 1.

A preparation method of a doped manganese phosphate precursor and a preparation method of a doped lithium manganese phosphate cathode material according to the disclosure will be described in detail with reference to the attached drawings and embodiments as follows.

Specifically, existing methods for preparing manganese phosphate materials generally use either low-valent manganese salts or high-valent manganese salts as raw materials alone. When using the low-valent manganese salts to prepare manganese phosphate materials requires strong oxidizing agents such as nitrates, which leads to high production costs and generation of nitrogen oxides that cause environmental pollution. When using the high-valent manganese salts as one of the raw materials to react with phosphoric acid to prepare the manganese phosphate materials has the disadvantage of high cost. Moreover, to avoid a disproportionation reaction of high-valent manganese ions ($Mn^{3+}$) in water, the above methods do not add extra water during the preparation process, which to some extent limits its industrial application. Additionally, it is not possible to achieve doping with other elements during the preparation process. The method of the disclosure uses the high-valent manganese salts as oxidants to prepare high-purity doped manganese phosphate precursor materials in an acidic aqueous solution containing doping metal M salts, divalent manganese salts, and phosphoric acid. The mixed solution undergoes a redox reaction with the high-valent manganese salts, and a chemical equation of a reaction process of the disclosure is expressed as follows:

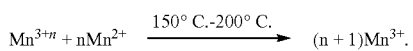

$$Mn^{3+n} + nMn^{2+} \xrightarrow{150°C.-200°C.} (n+1)Mn^{3+}.$$

The disclosure utilizes a strong oxidizing nature of the high-valent manganese salts under strongly acidic conditions and explores the conditions for the stable existence of $Mn^{3+}$ in the aqueous solution. This enables the oxidation of low-valent manganese salts (divalent manganese salts) to prepare manganese phosphate materials directly in the aqueous solution, avoiding the need for pondus hydrogenii (pH) adjustment during the reaction process. By dissolving the manganous salts and doping metal M salts in sulfuric acid solution or other acidic solutions, the method not only prepares manganese phosphate materials but also achieves doping with transition metal elements during the preparation process. The preparation method has short reaction time, low cost, simple process, environmental friendliness, and green sustainability, and holds significant industrial value.

A preparation method of a doped manganese phosphate precursor is provided and includes steps as follows.

Step 1: manganous salt and a doping metal M salt are dissolved in an acidic solution (sulfuric acid solution) to obtain a dissolved solution, and then the dissolved solution is mixed with a concentrated phosphoric acid to form a mixed solution.

Step 2: the mixed solution is heated at a heating temperature to obtain a heated solution, then a high-valent manganese ($Mn^{3+n}$) salt is added into the heated solution to perform a reaction. After the reaction is complete, a precursor slurry is obtained. The heating temperature of the mixed solution is in a range of 150° C. to 250° C., and n=1, 3, 4.

Step 3: the precursor slurry is washed, filtered, and dried to yield the doped manganese phosphate precursor ($Mn_xFe_{1-x}PO_4 \cdot H_2O$), where $0.5 \leq x \leq 1.0$.

In an embodiment, the manganous salt and the doping metal M salt can be dissolved in a sulfuric acid solution and then mixed with concentrated phosphoric acid to form the mixed solution. By dissolving the manganous salt and the doping metal M salt in the sulfuric acid solution, the preparation method allows for the doping of transition metal elements during the preparation of manganese phosphate materials. A concentration of the sulfuric acid solution is in a range of 1 mol/L to 18 mol/L. For example, the concentration of sulfuric acid solution can be 9 mol/L. A mass fraction of the concentrated phosphoric acid is in a range of 40 weight percentage (wt %) to 85 wt %. For example, the mass fraction of the concentrated phosphoric acid can be 60 wt %.

In an embodiment, the manganous salt includes at least one selected from the group consisting of manganous sulfate, manganous acetate, manganous chloride, and manganous oxalate. Certainly, the manganous salt of the disclosure is not limited to this, any soluble salt with manganese in the divalent state is acceptable.

In an embodiment, the doping metal M salt is a soluble salt, where M includes at least one selected from the group consisting of Fe, Ni, Co, Mg, Ta, and Nb.

In an embodiment, a concentration of metal cations in the mixed solution is in a range of 0.5 mol/L to 2.5 mol/L. The metal cation concentration is maintained within this range to ensure a high yield of metal elements. For example, in a specific embodiment, the concentration of metal cations in the mixed solution can be 0.7 mol/L to 2.3 mol/L, 0.9 mol/L to 2.0 mol/L, 1.1 mol/L to 1.8 mol/L, 1.4 mol/L to 1.6 mol/L, or a combination of the above ranges.

In an embodiment, the high-valent manganous salt can be a manganese salt where the manganese element is in the +4, +6, or +7 oxidation state, or it can also be a mixture of manganese salts where the manganese element is in the +4, +6, and +7 oxidation states. For example, a high-valent manganese salt includes at least one selected from the group consisting of potassium permanganate, potassium manganate, and manganese dioxide. A molar ratio of the high-valent manganese salt to the metal cations in the mixed solution is in a range of 1:(1.2n–2.0n), where n=1, 3, 4. For example, the molar ratio of the high-valent manganese salt to the metal cations in the mixed solution can be 1:(1.2–2.0), or 1:(3.6–6.0), or a combination of the above. Further examples include molar ratios of 1:1.8, 1:2.5, 1:5.4, or 1:7.2, etc.

In an embodiment, a molar ratio of metal cations to phosphate anions in the mixed solution is in a range of 1:(2–2.5). For example, the molar ratio of metal cations to phosphate anions in the mixed solution is 1:2.1, 1:2.2, 1:2.3, or 1:2.4.

In an embodiment, the heating temperature of the mixed solution is in a range of 150° C. to 250° C., which allows the mixed solution to react with the high-valent manganese salt. For example, the heating temperature of the mixed solution can be 162° C. to 241° C., 175° C. to 232° C., 189° C. to 218° C., 195° C. to 207° C., or a combination of the above ranges.

In an embodiment, before obtaining the precursor slurry in the step 2, the preparation method further includes steps as follows. The mixed solution obtained in the step 1 is boiled down and then heated to 150° C. to 250° C. to mix with the high-valent manganese ($Mn^{3+n}$) salt.

In an embodiment, after mixing the mixed solution with the high-valent manganese salt in step 2, a redox reaction occurs. During the reaction, a uniform intermediate solution containing $[Mn(PO_4)_2]^{3-}$ is formed. After the reaction is complete, stirring the mixed solution for a certain period of time will yield a gray-green precursor slurry. For example, a stirring time after the reaction can be 5 min to 20 h. For example, the stirring time can be 20 min to 18 h, 50 min to 15 h, 3 h to 12 h, 5 h to 10 h, 7 h to 9 h, or a combination of the above ranges. The high-valent manganese $Mn^{3+n}$ salt can be continuously added to the heated mixed solution under stirring conditions, with an addition time ranging from 5 seconds to 50 h.

In an embodiment, the step 3 further includes the following steps. the precursor slurry is washed with deionized water at a temperature in a range of 20° C. to 100° C. for 3 to 5 times, with an addition amount of deionized water added each time being 2 to 100 times the mass of the precursor slurry. The drying temperature can be 60° C. to 150° C., and the drying time can be 5 h to 50 h.

A doped manganese phosphate precursor is prepared by using the preparation method of the doped manganese phosphate precursor mentioned above.

A preparation method of a doped lithium manganese phosphate cathode material is provided and includes steps as follows.

The doped manganese phosphate precursor prepared by using the preparation method mentioned above is mixed with a lithium source and a carbon source to obtain a mixture, and then the mixture is calcined under an inert atmosphere to obtain a carbon-coated $LiMn_xM_{1-x}PO_4/C$ cathode material, value of x in the chemical formula of the doped manganese phosphate precursor and the cathode material can both be greater than or equal to 0.5 and less than or equal to 1.0 ($0.5 \leq x \leq 1.0$).

In an embodiment, a molar ratio of lithium in the lithium source to a total amount of metal of Mn and Fe in the doped manganese phosphate precursor ($Mn_xM_{1-x}PO_4 \cdot H_2O$) is n(Li):n(Mn+Fe)=(1–1.10):1. For example, the molar ratio of n(Li):n(Mn+M)=1.02:1, 1.05:1, or 1.08:1.

In an embodiment, an amount of the carbon source added can be calculated based on the sum of atomic weights of total non-lithium metal atoms (i.e., metal cations other than lithium ions), with 5 g to 50 g of carbon source added per 1 mol of the total molar amount of non-lithium metals. For example, 10 g to 40 g of carbon source can be added per 1 mol of the total molar amount of non-lithium metals. In another example, 20 g to 30 g of carbon source can be added.

In an embodiment, the calcining further includes steps as follows. The mixture is held at 300° C. to 500° C. for 3 h to 10 h, followed by calcining at 600° C. to 800° C. for 5 h to 20 h. For example, the mixture is held at 400° C. for 6 h, followed by calcining at 700° C. for 12 h.

In an embodiment, the lithium source includes at least one selected from the group consisting of $Li_2CO_3$, $LiNO_3$, and $LiOH \cdot H_2O$. The carbon source includes at least one selected from the group consisting of starch, polyvinyl alcohol, sucrose, citric acid, and glucose.

A doped lithium manganese phosphate cathode material prepared by using the preparation method of the doped lithium manganese phosphate cathode material mentioned above. The doped lithium manganese phosphate cathode material is a carbon-coated $LiMn_xM_{1-x}PO_4/C$ cathode material, where $0.5 \leq x \leq 1.0$.

In order to better understand the disclosure, specific embodiments are provided below to further illustrate the content of the disclosure, but the content of the disclosure is not limited to the following embodiments.

Embodiment 1

Step 1: 2.8 g of ferrous sulfate, 11.2 g of manganous sulfate, and 23.2 g of concentrated phosphoric acid with a mass fraction of 85% are weighed to added into a 200 ml conical flask, then 1 mol/L sulfuric acid solution is added into the 200 ml conical flask to dissolve the manganous sulfate, the ferrous sulfate, and the phosphoric acid in the sulfuric acid solution, followed by mixing and stirring evenly to obtain a mixed solution.

Step 2: the mixed solution is heated and stirred until it reaches 250° C., then 6 g of potassium permanganate is added into the mixed solution. The mixed solution added with the potassium permanganate is maintained at 250° C. for a reaction time of 1 hour. After the reaction is complete, a precursor slurry is obtained.

Step 3: the precursor slurry is filtered, washed, and dried to obtain a gray-green iron-doped manganese phosphate powder ($Mn_{0.8}Fe_{0.2}PO_4 \cdot H_2O$) with a yield of transition metals and manganese ions of approximately 99%. The prepared iron-doped manganese phosphate precursor is then subjected to an XRD analysis, and results are shown in FIG. 1. The iron-doped manganese phosphate precursor obtained in the embodiment is primarily composed of monohydrate manganese phosphate.

Figure 2:
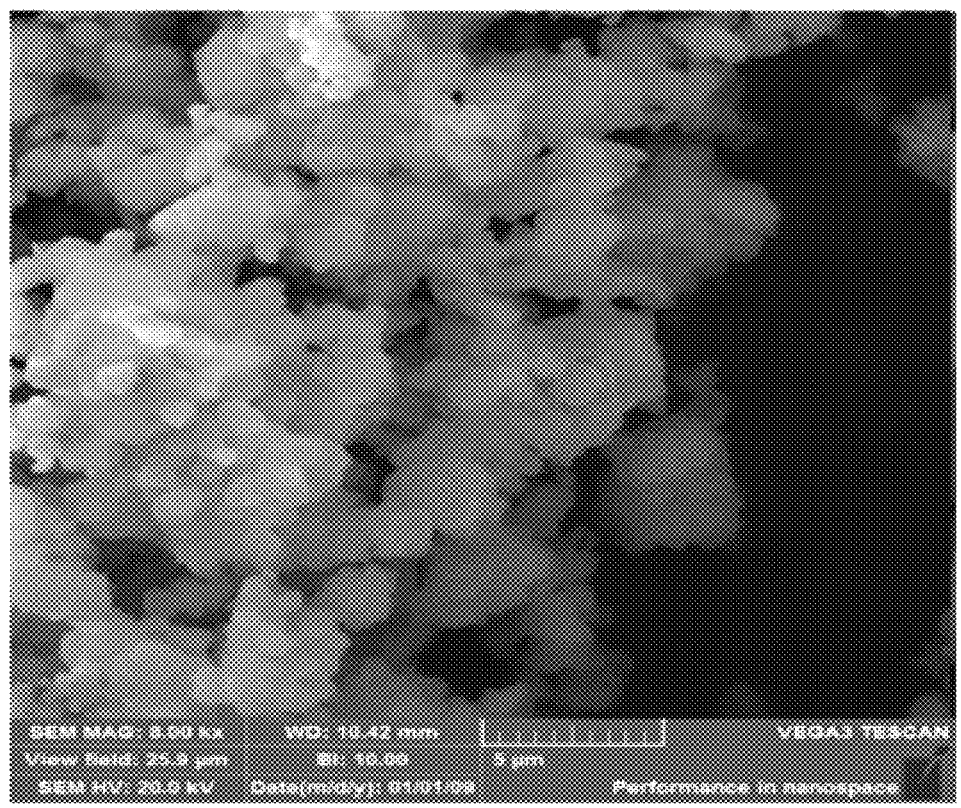
FIG. 2 illustrates a scanning electron microscope (SEM) image of the iron-doped manganese phosphate precursor prepared in the embodiment 1.

The iron-doped manganese phosphate precursor prepared in the embodiment is then subjected to an SEM analysis, and results are shown in FIG. 2. The manganese phosphate particles prepared in the embodiment have a uniform particle size distribution, with the particles being spherical in shape at a nano-micro scale.

Figure 3:
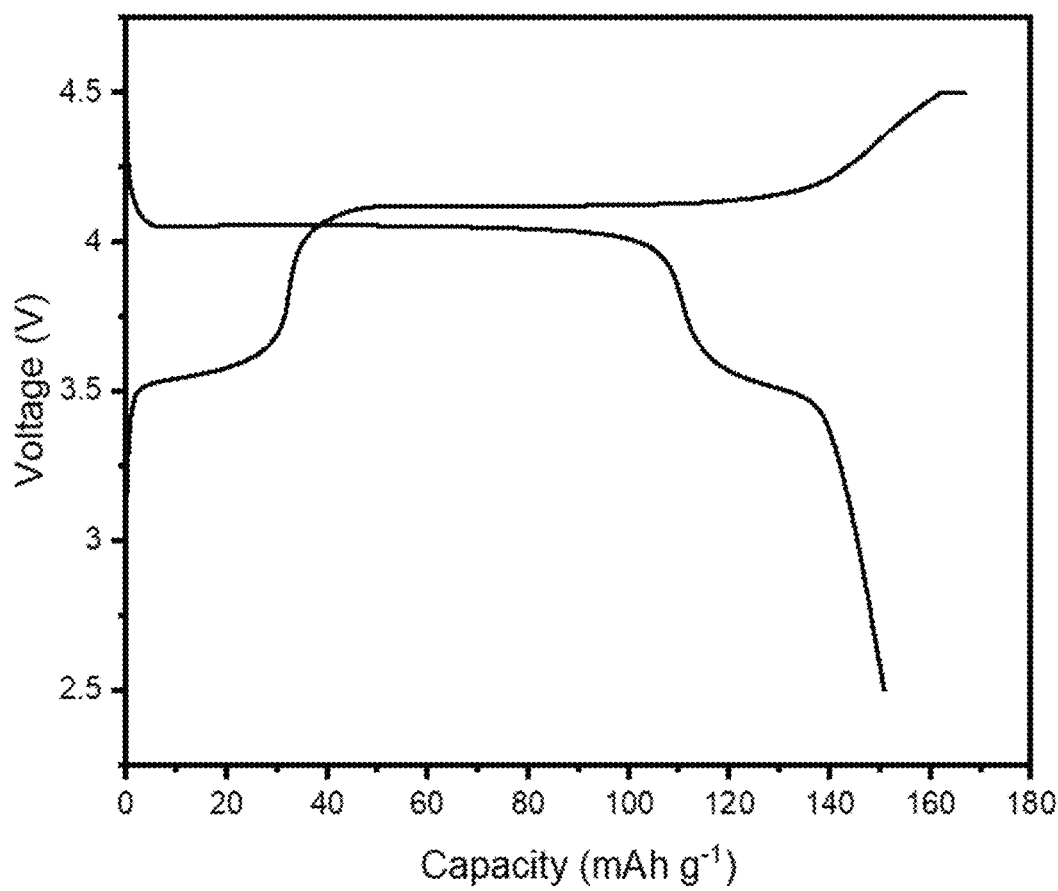
FIG. 3 illustrates a charge-discharge curve of a battery assembled with the iron-doped manganese phosphate precursor prepared in the embodiment 1.

The precursor (iron-doped manganese phosphate precursor) obtained in the embodiment is subjected to a lithium mixing, with a lithium mixing ratio of 1.10:1 and addition amount of the carbon source being 0.5 g to obtained a mixture. The lithium mixing ratio is molar ratio of the lithium source to the precursor. Since the precursor consists of nano-microscale particles, a ball milling is employed for mixing the mixture. A ball milling procedure includes: a rotation speed of 400 revolutions per minute (rpm) for 4 h. After the ball milling, the sample (the mixture) is placed into a tube furnace for calcining. The calcining process is carried out in a nitrogen atmosphere, with the following program: the sample is held at 300° C. for 3 h, followed by calcining at 800° C. for 20 h to obtain a product. The product is then subjected to electrochemical testing, and the results are shown in FIG. 3. The battery assembled using the iron-doped manganese phosphate precursor obtained in the embodiment achieved a discharge capacity of 151.8 milliampere-hour per gram ($mAh\ g^{-1}$) at 0.1 coulombs (C).

Embodiment 2

Step 1: 2.8 g of ferrous sulfate, 11.2 g of manganous sulfate, and 23.2 g of concentrated phosphoric acid with a mass fraction of 85% are weighed to added into a 200 ml conical flask, then 6 mol/L sulfuric acid solution is added into the 200 mL conical flask to dissolve the manganous sulfate, the ferrous sulfate, and the phosphoric acid in the sulfuric acid solution, followed by mixing and stirring evenly to obtain a mixed solution.

Step 2: the mixed solution is heated and stirred until it reaches 200° C., then 12 g of potassium permanganate is added into the mixed solution. The mixed solution added with the potassium permanganate is maintained at 200° C. for a reaction time of 10 h. After the reaction is complete, a precursor slurry is obtained.

Step 3: the precursor slurry is filtered, washed, and dried to obtain a gray-green iron-doped manganese phosphate powder ($Mn_{0.8}Fe_{0.2}PO_4 \cdot H_2O$) with a yield of transition metals and manganese ions of approximately 99%.

The precursor (iron-doped manganese phosphate precursor) obtained in the embodiment is subjected to a lithium mixing, with a lithium mixing ratio of 1.03:1 and an addition amount of the carbon source being 1.5 g to obtained a mixture. Since the precursor consists of nano-microscale particles, a ball milling is employed for mixing the mixture. The ball milling procedure includes: a rotation speed of 400 rpm for 4 h. After the ball milling, the sample (the mixture) is placed into a tube furnace for calcining. The calcining process is carried out in a nitrogen atmosphere, with the following program: the sample is held at 400° C. for 7 h, followed by calcining at 750° C. for 10 h to obtain a product. The battery assembled using the iron-doped manganese phosphate precursor obtained in the embodiment achieved a discharge capacity of 148.6 $mAh\ g^{-1}$ at 0.1 C.

Embodiment 3

Step 1: 2.8 g of ferrous sulfate, 11.2 g of manganous sulfate, and 23.2 g of concentrated phosphoric acid with a mass fraction of 85% are weighed to added into a 200 mL conical flask, then 98 mol/L sulfuric acid solution is added into the 200 ml conical flask to dissolve the manganous sulfate, the ferrous sulfate, and the phosphoric acid in the sulfuric acid solution, followed by mixing and stirring evenly to obtain a mixed solution.

Step 2: the mixed solution is heated and stirred until it reaches 150° C., then 6 g of potassium permanganate is added into the mixed solution. The mixed solution added with the potassium permanganate is maintained at 150° C. for a reaction time of 5 min. After the reaction is complete, a precursor slurry is obtained.

Step 3: the precursor slurry is filtered, washed, and dried to obtain a gray-green iron-doped manganese phosphate powder ($Mn_{0.8}Fe_{0.2}PO_4 \cdot H_2O$) with a yield of transition metals and manganese ions of approximately 99%.

The precursor (iron-doped manganese phosphate precursor) obtained in the embodiment is subjected to a lithium mixing, with a lithium mixing ratio of 1:1 and an addition amount of the carbon source being 5 g to obtained a mixture. Since the precursor consists of nano-microscale particles, a ball milling is employed for mixing the mixture. The ball milling procedure includes: a rotation speed of 400 rpm for 4 h. After the ball milling, the sample (the mixture) is placed into a tube furnace for calcining. The calcining process is carried out in a nitrogen atmosphere, with the following program: the sample is held at 350° C. for 10 h, followed by calcining at 700° C. for 5 h to obtain a product. The battery assembled using the iron-doped manganese phosphate precursor obtained in the embodiment achieved a discharge capacity of 145.7 $mAh\ g^{-1}$ at 0.1 C.

Although the disclosure has been described above in conjunction with specific embodiments, those skilled in the art should understand that various modifications and changes can be made to the exemplary embodiments without departing from the spirit and scope defined by the claims.

What is claimed is:

1. A preparation method of a doped lithium manganese phosphate cathode material, comprising steps:
preparing a doped manganese phosphate precursor by the following steps:
adding manganous sulfate, ferrous sulfate, and concentrated phosphoric acid to a 200 milliliters (mL) conical flask, then adding sulfuric acid solution to the 200 mL conical flask to dissolve the manganous sulfate, the ferrous sulfate, and the concentrated phosphoric acid in the sulfuric acid solution, followed by mixing and stirring evenly to obtain a mixed solution with an acidic condition;
heating and stirring the mixed solution until the mixed solution reaches 150° C., then adding potassium permanganate as an oxidizing agent into the mixed solution, followed by maintaining the mixed solution added with the potassium permanganate at 150° C. for a reaction time of 5 minutes (min); and obtaining a precursor slurry after the reaction is completed; and
washing, filtering, and drying the precursor slurry to yield the doped manganese phosphate precursor ($Mn_xFe_{1-x}PO_4 \cdot H_2O$), where x is greater than or equal to 0.5 and less than or equal to 1.0; and
mixing the doped manganese phosphate precursor with a lithium source and a carbon source to obtain a mixture, and then calcining the mixture under an inert atmosphere to obtain a carbon-coated $LiMn_xM_{1-x}PO_4/C$ cathode material, where x is greater than or equal to 0.5 and less than or equal to 1.0, and M comprises at least one selected from the group consisting of Fe, nickel (Ni), cobalt (Co), magnesium (Mg), tantalum (Ta), and niobium (Nb).

2. The preparation method of the doped lithium manganese phosphate cathode material as claimed in claim 1, wherein a molar ratio of lithium (Li) in the lithium source to a total amount of metal of manganese (Mn) and iron (Fe) in the doped manganese phosphate precursor is $n(Li):n(Mn+Fe)=(1-1.10):1$, wherein n is a number of moles; an addition amount of the carbon source, calculated based on a sum of atomic weights of total non-lithium metal atoms, is 5 grams (g) to 50 g per 1 mole of the total non-lithium metal atoms.

3. The preparation method of the doped lithium manganese phosphate cathode material as claimed in claim 1, wherein the lithium source comprises at least one selected from the group consisting of lithium carbonate ($Li_2CO_3$), lithium nitrate ($LiNO_3$), and lithium hydroxide monohydrate ($LiOH \cdot H_2O$);
wherein the carbon source comprises at least one selected from the group consisting of starch, polyvinyl alcohol, sucrose, citric acid, and glucose;
wherein the calcining comprises: holding the mixture at 300° C. to 500° C. for 3 to 10 hours (h), followed by calcining at 600° C. to 800° C. for 5 h to 20 h.

* * * * *